(12) United States Patent
Gundert et al.

(10) Patent No.: US 8,940,654 B2
(45) Date of Patent: Jan. 27, 2015

(54) CATALYST COMPONENTS FOR THE POLYMERIZATION OF OLEFINS AND CATALYSTS THEREFROM OBTAINED

(75) Inventors: Friedhelm Gundert, Liederbach (DE); Martin Schneider, Kelkeim (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 13/703,622

(22) PCT Filed: Jun. 6, 2011

(86) PCT No.: PCT/EP2011/059289
§ 371 (c)(1),
(2), (4) Date: Dec. 11, 2012

(87) PCT Pub. No.: WO2011/157582
PCT Pub. Date: Dec. 22, 2011

(65) Prior Publication Data
US 2013/0085243 A1    Apr. 4, 2013

(30) Foreign Application Priority Data
Jun. 18, 2010    (EP) .................... 10166443

(51) Int. Cl.
| | | |
|---|---|---|
| *B01J 37/00* | (2006.01) | |
| *C08F 4/02* | (2006.01) | |
| *C08F 4/60* | (2006.01) | |
| *C08F 4/00* | (2006.01) | |
| *C08F 4/44* | (2006.01) | |
| *C08F 4/06* | (2006.01) | |
| *C08F 4/42* | (2006.01) | |
| *C08F 4/654* | (2006.01) | |
| *C08F 10/00* | (2006.01) | |

(52) U.S. Cl.
CPC ............... *C08F 4/6546* (2013.01); *C08F 10/00* (2013.01)

USPC .......... 502/132; 502/133; 526/90; 526/124.2; 526/126

(58) Field of Classification Search
USPC .................................................. 526/128, 352
See application file for complete search history.

(56) References Cited

U.S. PATENT DOCUMENTS

| | | | | |
|---|---|---|---|---|
| 3,356,640 | A | * 12/1967 | Meyer et al. | ................... 522/157 |
| 4,239,650 | A | * 12/1980 | Franke et al. | ................. 502/111 |
| 4,448,944 | A | 5/1984 | Berthold et al. | |
| 2005/0176900 | A1 | * 8/2005 | Zhu et al. | ................... 526/124.3 |

FOREIGN PATENT DOCUMENTS

| | | | |
|---|---|---|---|
| EP | 0043473 | 1/1982 | |
| EP | 0095138 | 11/1983 | |
| EP | 068256 | 1/1993 | |
| EP | 1197497 | 12/1999 | |
| EP | 1197497 A1 | * 4/2002 | ............. C08F 4/658 |
| WO | WO-03/099882 | 12/2003 | |

* cited by examiner

*Primary Examiner* — David W Wu
*Assistant Examiner* — Elizabeth Eng

(57) ABSTRACT

A catalyst component for the polymerization of olefins obtained by:
(a) reacting in a inert hydrocarbon suspension medium a $Mg(OR_1)(OR_2)$ compound, in which $R_1$ and $R_2$ are identical or different and are each an alkyl radical having 1 to 10 carbon atoms, with a tetravalent transition metal compound having at least a Metal-halogen bond, used in amounts such that the molar ratio metal/Mg is from 0.05 to 10, thereby obtaining a solid reaction product dispersed in a hydrocarbon slurry,
(b) washing the solid reaction product dispersed in a hydrocarbon slurry with a liquid hydrocarbon,
(c) contacting the washed solid reaction product obtained in (b) with a tetravalent titanium compound and
(d) contacting the product obtained in (c) with an organometallic compound of a metal of group 1, 2 or 13 of the Periodic Table.

13 Claims, No Drawings

CATALYST COMPONENTS FOR THE POLYMERIZATION OF OLEFINS AND CATALYSTS THEREFROM OBTAINED

This application is the U.S. national phase of International Application PCT/EP2011/059289, filed Jun. 6, 2011, claiming priority to European Patent Application 10166443.1 filed Jun. 18, 2010; the disclosures of International Application PCT/EP2011/059289 and European Patent Application 10166443.1, each as filed, are incorporated herein by reference.

The present invention relates to catalyst components for the polymerization of olefins $CH_2=CHR$, wherein R is hydrogen or hydrocarbon radical having 1-12 carbon atoms. In particular, the invention relates to catalyst components suitable for the preparation of homopolymers and copolymers of ethylene and to the catalysts obtained therefrom.

Specifically, the present invention relates to solid catalyst components, comprising titanium magnesium and halogen, and obtainable by a specified sequence of reaction steps.

The catalysts of the invention are suitably used in (co) polymerization processes of ethylene to prepare (co)polymers having medium-narrow Molecular Weight Distribution (MWD) and high activity. The MWD is an important characteristic of ethylene polymers in that it affects both the rheological behavior, and therefore the processability, and the final mechanical properties. In particular, polymers with narrow MWD are suitable for cast films and injection moulding in that deformation and shrinkage problems in the manufactured article are minimized The width of the molecular weight distribution for the ethylene polymers is generally expressed as melt flow rate ratio $FRR_{21.6/5}$ or melt flow rate ratio $FRR_{21.6/2.16}$, respectively. $FRR_{21.6/5}$ is the ratio between the melt index measured by a load of 21.6 Kg and that measured with a load of 5 Kg, whereas $FRR_{21.6/2.16}$ is the ratio between the melt index measured by a load of 21.6 Kg and that measured with a load of 2.16 Kg. The measurements of melt index are carried out according to ISO1133 and at 190° C.

Catalyst components having the capability of giving polymers with narrow molecular weight distribution are also useful to prepare polymer compositions with broad molecular weight distribution. In fact, one of the most common methods for preparing broad MWD polymers is the multi-step process based on the production of different molecular weight polymer fractions in each step, sequentially forming macromolecules with different length on the catalyst particles. The control of the molecular weight obtained in each step can be carried out according to different methods, for example by varying the polymerization conditions or the catalyst system in each step, or by using a molecular weight regulator. Regulation with hydrogen is the preferred method in industrial plants. It has been observed that final compositions of optimal properties are obtainable when a catalyst is used able to provide polymers with narrow MWD and different average Mw in each single step that, when combined together form final compositions with broad molecular weight distribution. In these multistep processes a critical step is that in which the lower average molecular weight polymer fraction is prepared. In fact, one of important features that the catalyst should possess is the so called "hydrogen response", that is the extent of capability to reduce the molecular weight of polymer produced in respect of increasing hydrogen concentration. Higher hydrogen response means that a lower amount of hydrogen is required to produce a polymer with a certain molecular weight. In turn, a catalyst with good hydrogen response would also usually display a higher activity in ethylene polymerization due to the fact that hydrogen has a depressive effect on the catalyst activity. Moreover, it is also important that the polymer chains show a limited amount of long chain branching which in certain applications are responsible for lowering certain properties like impact strength and ESCR.

In view of the above, it would be therefore useful to have a catalyst component able to provide ethylene polymers with narrow molecular weight distribution, combined with a good balance of polymerization activity and morphological stability.

A catalyst component for use in ethylene (co)polymerization is described in the WO03/099882. It concerns polymerizing in the presence of a catalyst consisting of the product of the reaction of a gelatinous dispersion of magnesium alkoxide with a transition-metal compound (component a) and an organometallic compound (component b). The reaction between the gelatinous dispersion of magnesium alkoxide and the transition metal compound for the formation of component (a) is carried out in the liquid hydrocarbon phase. The so obtained reaction mixture is then directly reacted with the organoaluminum compound (b) without any intermediate treatment. Although showing properties of interest, the catalyst did not produce sufficiently high polymerization activity and sufficiently narrow molecular weight distribution. In principle, narrowing of MWD could be obtained by using certain oxygenated electron donor compounds. However, this usually involves a reduced polymerization activity of the catalyst. In the case of the catalysts disclosed in WO03/099882 the activity is already not particularly high, thus the use of an electron donor for narrowing MWD would involve too low activity for operation in an industrial plant.

It has now surprisingly been discovered that by modifying the catalyst preparation recipe disclosed in the prior art, it is possible to greatly improve its polymerization activity making it suitable also for the use in combination with an electron donor. Therefore, it is an object of the present invention a catalyst component for the polymerization of olefins obtained by a process comprising:

(a) reacting in a inert hydrocarbon suspension medium a $Mg(OR_1)(OR_2)$ compound, in which $R_1$ and $R_2$ are identical or different and are each an alkyl radical having 1 to 10 carbon atoms, with a tetravalent transition metal compound having at least a Metal-halogen bond, used in amounts such that the molar ratio metal/Mg is from 0.05 to 10, thereby obtaining a solid reaction product dispersed in a hydrocarbon slurry, (b) washing the solid reaction product dispersed in a hydrocarbon slurry with a liquid hydrocarbon, (c) contacting the washed solid reaction product obtained in (b) with a tetravalent titanium compound and (d) contacting the product obtained in (c) with an organometallic compound of a metal of group 1, 2 or 13 of the Periodic Table.

In step (a) of the preparation of the catalyst component, $R_1$ and $R_2$ are preferably alkyl groups having from 2 to 10 carbon atoms or a radical —$(CH_2)_nOR_3$, where $R_3$ is a $C_1$-$C_4$-alkyl radical and n is an integer from 2 to 6. Preferably $R_1$ and $R_2$ are $C_1$-$C_2$-alkyl radical. Examples of such magnesium alkoxides are: magnesium dimethoxide, magnesium diethoxide, magnesium di-i-propoxide, magnesium di-n-propoxide, magnesium di-n-butoxide, magnesium methoxide ethoxide, magnesium ethoxide n-propoxide, magnesium di(2-methyl-1-pentoxide), magnesium di(2-methyl-1-hexoxide), magnesium di(2-methyl-1-heptoxide), magnesium di(2-ethyl-1-pentoxide), magnesium di(2-ethyl-1-hexoxide), magnesium di(2-ethyl-1-heptoxide), magnesium di (2-propyl-1-heptoxide), magnesium di(2-methoxy-1-ethoxide), magnesium di(3-methoxy-1-propoxide), magnesium di(4-methoxy-1-butoxide), magnesium di(6-methoxy-1-hexoxide), magnesium di(2-ethoxy-1-ethoxide), magnesium di(3-ethoxy-1-propoxide), magnesium di(4-ethoxy-l-butoxide), magnesium di(6-ethoxy-1-hexoxide), magnesium dipentoxide, magnesium dihexoxide. Preference is given to using the simple magnesium alkoxides such as magnesium diethoxide, magnesium di-n-propoxide and magnesium di-i-butoxide. Magnesium diethoxide is the preferred one. It can be used as a suspension or as a gelatineous dispersion. The suspension or the gel can be prepared starting from commercially available $Mg(OC_2H_5)_2$ usually having average particle diameter ranging from 200 to 1200 μm preferably from 500 to 800 μm.

Preferably before the reaction with the transition metal halide the magnesium alcoholate is suspended in an inert, saturated hydrocarbon. In order to lowering the magnesium alcoholate particle size, the suspension can be subject to high shear stress conditions by means of a high-speed disperser (for example Ultra-Turrax or Dispax, IKA-Maschinenbau Janke & Kunkel GmbH) working under inert atmosphere (Ar or $N_2$). Preferably the shear stress is applied until a gel-like dispersion is obtained. This dispersion differs from a standard suspension in that it is substantially more viscous than the suspension and is gel-like. Compared with the suspended magnesium alcoholate, the dispersed magnesium alcoholate settles out much more slowly and to a far lesser extent.

The magnesium alkoxide is firstly reacted with the tetravalent transition metal compound of the formula (II)

$$MX_m(OR_4)_{4-m} \quad (II),$$

where M is titanium, zirconium or hafnium, preferably titanium or zirconium, more preferably titanium, $R_4$ is an alkyl radical having from 1 to 9, preferably from 1 to 4 carbon atoms and X is a halogen atom, preferably chlorine, and m is from 1 to 4, preferably from 2 to 4.

Examples which may be mentioned are: $TiCl_4$, $TiCl_3(OC_2H_5)$, $TiCl_2(OC_2H_5)_2$, $TiCl(OC_2H_5)_3$, $TiCl_3(OC_3H_7)$, $TiCl_2(OC_3H_7)_2$, $TiCl(OC_3H_7)_3$, $TiCl_3OC_4H_9)$, $TiCl_2(OC_4H_9)_2$, $TiCl(OC_4H_9)_3$, $TiCl_3(OC_6H_{13})$, $TiCl_2(OC_6H_{13})_2$, $TiCl(OC_6H_{13})_3$, $ZrCl_4$, preference is given to using $TiCl_4$ or $ZrCl_4$. Particular preference is given to $TiCl_4$.

The reaction of the magnesium alkoxide with the tetravalent transition metal compounds is carried out at a temperature at from 50 to 140° C., preferably from 60 to 120° C., more preferably from 70 to 90° C. over a period of from 0.1 to 20 hours, preferably within 1 to 10 hours, more preferably within 1 to 7 hours. Suitable inert hydrocarbon suspension media for the abovementioned reactions include aliphatic and cycloaliphatic hydrocarbons such as butane, pentane, hexane, heptane, cyclohexane, isooctane and also aromatic hydrocarbons such as benzene and xylene. Petroleum spirit and hydrogenated diesel oil fractions which have carefully been freed of oxygen, sulfur compounds and moisture can also be used.

The magnesium alkoxide and the tetravalent transition metal compound can be reacted in a molar ratio of Metal/Mg ranging from 0.05 to 5, preferably from 0.1 to 1. At the end of the reaction a solid product is obtained by removing of the liquid phase.

In step (b) one or more washing step with inert hydrocarbon are carried out until the supernatant mother liquor has Cl and Ti concentrations of less than 10 mmol/dm³. The washing step can be carried out with the same hydrocarbon medium used in step (a) at a temperature ranging from 10° C. to the boiling point of the medium used. Preferably, it is carried out under mild conditions and more preferably at room temperature when working at Ti/Mg molar ratios in the range of 0.1 to 1. Washings at higher temperature are suitable for higher Ti/Mg molar ratios.

After the washing the solid product coming from (b), preferably still in form of a concentrated slurry, is contacted in step (c) with a tetravalent titanium compound of formula $TiX_m(OR_4)_{4-m}$ where X and m have the same meaning disclosed above. Preferred titanium compounds are $TiCl_4$, $TiCl_3(OC_2H_5)$, $TiCl_2(OC_2H_5)_2$, $TiCl(OC_2H_5)_3$, $TiCl_3(OC_3H_7)$, $TiCl_2(OC_3H_7)_2$, $TiCl(OC_3H_7)_3$, $TiCl_3OC_4H_9)$, $TiCl_2(OC_4H_9)_2$, $TiCl(OC_4H_9)_3$, $TiCl_3(OC_6H_{13})$, $TiCl_2(OC_6H_{13})_2$, $TiCl(OC_6H_{13})_3$. $TiCl_4$ being the most preferred.

The product coming from (b) and the tetravalent transition metal compound can be contacted in a molar ratio of Ti/Mg ranging from 0.001 to 1, preferably from 0.01 to 0.1. At the end of the reaction a solid product is obtained by totally or partially removing of the liquid phase.

In the subsequent step (d), an organometallic compound of a metal of group 1, 2 or 13 of the Periodic Table is reacted with the solid reaction product of step (c). Preferably, the organometallic compound is chosen among organoaluminum compounds. Suitable organoaluminum compounds are chlorine-containing organoaluminum compounds, e.g. dialkylaluminum monochlorides of the formula $R^3_2AlCl$ or alkylaluminum sesquichlorides of the formula $R^3_3Al_2Cl_3$, where $R^3$ is an alkyl radical having from 1 to 16 carbon atoms. Examples which may be mentioned are $(C_2H_5)_2AlCl$, $(iC_4H_9)_2AlCl$, $(C_2H_5)_3Al_2Cl_3$. It is also possible to use mixtures of these compounds.

The organoaluminum compound can be added in a molar ration of 0.1 to 2, preferably from 0.3 to 1 with respect to magnesium alkoxide. The reaction is carried out in suspension under stirring at a temperature ranging from 0 to 150° C., preferably from 60 to 120° C. within 0.5 to 7 hours, preferably from 1 to 5 hours.

At the end of the preparation process the particle size of the catalyst component (component A) preferably ranges from 5 to 30 μm.

As already explained the catalyst component obtained with this process is endowed with such a high activity that makes it possible for it to incorporate also an electron donor for the narrowing of the molecular weight distribution of the polymer while maintaining an activity of industrial interest.

The electron donor is preferably selected from oxygenated compounds belonging to ethers, esters, alcohols, aldehydes, alkoxysilanes, and ketones.

Particularly preferred are the silicon compounds of formula $R^I_a R^{II}_b Si(OR^{III})_{4-(a+b)}$ where $R^I$-$R^{III}$ are linear, branched, cyclic or aromatic $C_1$-$C_{20}$ hydrocarbon groups a and b are integers from 0 to 2 with the proviso that (a+b) ranges from 1 to 3.

Preferably $R^{III}$ is a linear $C_1$-$C_5$ alkyl, preferably methyl or ethyl. In this connection, when b is 0, $R^I$ is preferably a linear, branched or cyclic alkyl radical or an aryl radical having from 3 to 10 carbon atoms and a is 1. In this embodiment, $R^I$ is preferably selected from propyl, isopropyl, isobutyl, cyclopentyl, and phenyl.

According to another embodiment, a and b are 1, $R^I$ is selected from $C_3$-$C_{10}$ cycloalkyl or aryl groups, $R^{II}$ is selected from linear $C_1$-$C_5$ alkyl groups and $R^{III}$ is a linear $C_1$-$C_5$ alkyl, preferably methyl or ethyl.

Non limiting exemplary silicon compounds include diethyldimethoxysilane, dipropyldimethoxysilane, diisopropyldimethoxysilane, dibutyldimethoxysilane, diisobutyldimethoxysilane, isobutylmethyldimethoxysilane, isopropylisobutyldimethoxysilane, dicyclopentyldimethoxysilane, cyclohexylmethyldimethoxysilane, diphenyldimethoxysilane, propyltrimethoxysilane, isopropyltrimethoxysilane, butyltrimethoxysilane isobutyltrimethoxysilane, cyclopentyltrimethoxysilane, phenyltrimethoxysilane, diethyldiethoxysilane, dipropyldiethoxysilane, diisopropyldiethoxysilane, dibutyldiethoxysilane, diisobutyldiethoxysilane, isobutylmethyldiethoxysilane, isopropylisobutyldimethoxysilane, dicyclopentyldiethoxysilane, cyclohexylmethyldiethoxysilane, diphenyldiethoxysilane, propyltriethoxysilane, isopropyltriethoxysilane, butyltriethoxysilane isobutyltriethoxysilane, cyclopentyltriethoxysilane, phenyltriethoxysilane. Preference is given to group of diethoxysilanes. Most preferably compounds selected from group of triethoxysilanes are used. The electron donor can be used in any of the step (a), (c) or (d). Preferably, it is used after completion of step (d) by combining the solid catalyst component with the silicon compound of formula $R^I_a R^{II}_b Si(OR^{III})_{4-(a+b)}$ reported above. The aforementioned silicon compound can be added in a molar ratio of 0.1 to 3, preferably from 0.3 to 1 with respect to transition metal fixed on the solid component after the reaction with magnesium alkoxide. The reaction is carried out in suspension under stirring at a temperature ranging from 0 to 150° C., preferably from 60 to 120° C. within 0.5 to 5 hours, preferably from 1 to 2 hours.

The catalyst component of the invention can be converted into active catalyst system by reacting it with a trialkylaluminum (component B) having from 1 to 6 carbon atoms in the alkyl radical, e.g. triethylaluminum, triisobutylaluminum, triisohexylaluminum, Preference is given to triethylaluminum and triisobutylaluminum.

The mixing of the component (A) and the component (B) can be carried out in a stirred vessel at a temperature of from −30° C. to 150° C. prior to the polymerization. It is also possible to combine the two components directly in the polymerization vessel at a polymerization temperature of from 20° C. to 200° C.

It is also possible firstly to prepolymerize the preactivated catalyst system with alpha-olefins, preferably linear C2-C10-1-alkenes and in particular ethylene or propylene, and then to use the resulting prepolymerized catalyst solid in the actual polymerization. The mass ratio of catalyst solid used in the prepolymerization to monomer polymerized onto it is usually in the range from 1:0.1 to 1:2.

It is also possible to isolate the catalyst in the non-prepolymerized form or in the prepolymerized form and store it as a solid and re-suspend it on later use.

The catalysts systems of the invention are particularly suited for liquid phase polymerization process. In fact, the small average particle size of the component (A), such as less than 30 μm, preferably ranging from 5 to 20 μm, is particularly suited for slurry polymerization in an inert medium, which can be carried out continuously stirred tank reactor or in loop reactors. In a preferred embodiment the polymerization process is carried out in two or more cascade loop or stirred tank reactors producing polymers with different molecular weight and/or different composition in each reactor. In addition, to the ethylene homo and copolymers mentioned above the catalysts of the present invention are also suitable for preparing very-low-density and ultra-low-density polyethylenes (VLDPE and ULDPE, having a density lower than 0.920 g/cm³, to 0.880 g/cm³) consisting of copolymers of ethylene with one or more alpha-olefins having from 3 to 12 carbon atoms, having a mole content of units derived from ethylene of higher than 80%; elastomeric copolymers of ethylene and propylene and elastomeric terpolymers of ethylene and propylene with smaller proportions of a diene having a content by weight of units derived from ethylene of between about 30 and 70%.

The following examples are given in order to further describe the present invention in a non-limiting manner.

EXAMPLES

The results for the elemental composition of the catalysts described reported in the examples were obtained by the following analytical methods:
Ti: photometrically via the peroxide complex
Mg, Cl: titrimetrically by customary methods
$MFR_{5/190}$: mass flow rate (melt index) in accordance with ISO1133, nominal load=5 kg and test temperature=190° C.
$FRR_{21.6/5}$: Flow rate ratio in accordance with EN ISO1133: $FRR_{21.6/5}=(MFR_{21.6/190}/MFR_{5/190})$
$FRR_{21.6/2.16}$: Flow rate ratio in accordance with EN ISO1133: $FRR_{21.6/2.16}=(MFR_{21.6/190}/MFR_{2.16/190})$
Bulk density: in accordance with DIN EN ISO 60
$d_{50}$ (mean particle diameter): in accordance with DIN 53477 and DIN66144

Example 1 a) Preparation of the Catalyst Component A:

114 g (1 mol) of commercial $Mg(OC_2H_5)_2$ were suspended in diesel oil (hydrogenated petroleum fraction having a boiling range of 140-170° C.) (total volume: 1.0 dm³). The suspension was converted into a dispersion in a cylindrical glass vessel under inert gas (Ar) to exclude moisture and air ($O_2$) using a high-speed stirrer (®Ultra-Turrax) with external cooling by means of an ice bath (time: about 8 hours). The dispersion had a gel-like consistency. A volume of 0.25 dm³ (containing 0.25 mol of $Mg(OC_2H_5)_2$) of the gel-like dispersion was transferred to a 1 dm³ glass flask provided with reflux condenser, 2-blade blade stirrer and inert gas blanketing (Ar), and 0.25 dm³ of diesel oil having a boiling range of 140-170° C. (hydrogenated petroleum fraction) was added and the mixture was stirred at room temperature for 10 minutes at a stirrer speed of 100 rpm.

This gel-like dispersion was brought to 85° C. while stirring at a stirrer speed of 250 rpm and 0.075 mol of $TiCl_4$ in 25 cm³ of diesel oil (hydrogenated petroleum fraction having a boiling range of 140-170° C.) was subsequently metered in over a period of 4 hours. After a post-reaction time of 0.5 hour, the suspension is cooled down to ambient temperature and the stirrer is switched off. After the solid had settled, the supernatant liquid phase (mother liquor) was taken off. The solid was subsequently re-suspended in fresh diesel oil (hydrogenated petroleum fraction having a boiling range from 140 to 170° C.) and after a stirring time of 15 minutes and subsequent complete settling of the solid, the supernatant liquid phase was taken off again. This washing procedure was repeated several times until titanium concentration of the supernatant liquid phase is below 10 mmol/dm³. Afterwards the mixture was heated to 85° C. Subsequently 0.0125 mol of titanium(IV) 2-ethylhexyloxide in 25 cm³ of diesel oil (hydrogenated petroleum fraction having a boiling range of 140-170° C.) was metered in over a period of 1 hour while stirring at a stirrer speed of 250 rpm. After a post-reaction time of 1 hour the suspension was heated to 110° C. Subsequently 0.175 mol of $Al_2(C_2H_5)_3Cl_3$ in 250 cm³ of diesel oil (hydrogenated petroleum fraction having a boiling range of 140-170° C.) was metered in over a period of 2 hours while stirring at a stirrer speed of 250 rpm. The temperature was subsequently held at 110° C. for a further 2 hours. Afterwards the suspension is cooled down to ambient temperature and the stirrer is switched off. After the solid had settled, the supernatant liquid phase (mother liquor) was taken off The solid was subsequently resuspended in fresh diesel oil (hydrogenated petroleum fraction having a boiling range from 140 to 170° C.) and after a stirring time of 15 minutes and subsequent complete settling of the solid, the supernatant liquid phase was taken off again. This washing procedure was repeated several times until chlorine and titanium concentration of the supernatant liquid phase is below 10 mmol/dm$^3$.

The molar ratio of the solid (=catalyst component A) was: Mg:Ti:Cl≈1:0.27:2.43. The titanium content of the solid catalyst component was 7.5 wt-% (=0.64 kg catalyst per mol titanium).

b) Ethylene Polymerization in Suspension

The polymerization experiments were carried out batchwise in a 200 dm$^3$ reactor. This reactor was equipped with an impeller stirrer and baffles. The temperature in the reactor was measured and automatically kept constant. The polymerization temperature was 85° C.

The polymerization reaction was carried out in the following way:

100 dm$^3$ of diesel oil (hydrogenated petroleum fraction having a boiling range from 140 to 170° C.) were placed in the N$_2$-blanketed reactor and heated to 85° C. Under a blanket of inert gas (N2), 50 mmol of triethylaluminum diluted to 200 cm$^3$ with diesel oil were added as cocatalyst (=catalyst component B) and the catalyst component A prepared as described under a) was subsequently introduced into the reactor in an amount corresponding to 2.0 mmol of titanium as a suspension diluted with diesel oil.

The reactor was pressurized a number of times with H$_2$ (hydrogen) to 8 bar and depressurized again to remove the nitrogen completely from the reactor (the procedure was monitored by measurement of the H$_2$ concentration in the gas space of the reactor, which finally indicated 95% by volume). The polymerization was started by opening the ethylene inlet. Ethylene was introduced in an amount of 8.0 kg/h over the entire polymerization time, with the pressure in the reactor rising slowly. The concentration of hydrogen in the gas space of the reactor was measured continually and the proportion by volume was kept constant by introducing appropriate amounts of hydrogen (% by volume of H$_2$ 40).

The polymerization was stopped after 225 minutes (total of 30 kg of ethylene gas fed in). For quantification of catalyst productivity the specific mileage is determined as follows:

Specific mileage=kg polyethylene/(g catalyst*bar$_{ethylene}$*polymerization-time in hours). The results of the polymerizations are shown in Table 1.

Example 2

Example 2 was performed in the same way as described in example 1) with the exception that chlorotriisopropoxytitanium(IV) was used instead of titanium(IV) 2-ethylhexyloxide.

The molar ratio of the solid (=catalyst component A) was: Mg:Ti:Cl≈1:0.28:2.41. The titanium content of the solid catalyst component was 7.6 wt-% (=0.63 kg catalyst per mol titanium).

The polymerization was carried out as described in Example 1. The results of the polymerizations are listed in Table 1.

Example 3

Example 3 was performed in the same way as described in example 1) with the exception that titanium(IV) propoxide was used instead of titanium(IV) 2-ethylhexyloxide.

The molar ratio of the solid (catalyst component A) was: Mg:Ti:Cl≈1:0.29:2.49. The titanium content of the solid catalyst component was 7.2 wt-% (=0.67 kg catalyst per mol titanium).

The polymerization was carried out as described in Example 1. The results of the polymerizations are listed in Table 1.

Example 4

Example 4 was performed in the same way as described in example 1) with the exception that titanium tetrachloride was used instead of titanium(IV) 2-ethylhexyloxide.

The molar ratio of the solid (=catalyst component A) was: Mg:Ti:Cl≈1:0.30:2.57. The titanium content of the solid catalyst component was 8.6 wt-% (=0.56 kg catalyst per mol titanium).The polymerization was carried out as described in Example 1. The results of the polymerizations are listed in Table 1.

Example 5

Example 5 was performed in the same way as described in example 1) with the exception that titanium(IV) 2-ethyl-1,3-hexanediolate was used instead of titanium(IV) 2-ethylhexyloxide.

The molar ratio of the solid (=catalyst component A) was: Mg:Ti:Cl≈1:0.29:2.45. The titanium content of the solid catalyst component was 8.1 wt-% (=0.59 kg catalyst per mol titanium). The polymerization was carried out as described in Example 1. The results of the polymerizations are listed in Table 1.

Comparative Example 1

Comparative example 1 was performed in the same way as described in example 1) with the exception that no washing procedure was carried out after the dosage of titanium tetrachloride and that no subsequent addition of a titanium compound was performed.

The molar ratio of the solid (catalyst component A) was: Mg:Ti:Cl≈1:0.30:2.34. The titanium content of the solid catalyst component was 7.6 wt-% (=0.63 kg catalyst per mol titanium). The polymerization was carried out as described in Example 1. The results of the polymerizations are listed in Table 1.

Example 6 a) Preparation of the Catalyst Component A:

A suspension of 4.0 kg (=35mol) of commercial available Mg(OC$_2$H$_5$)$_2$ in 25 dm$^3$ of diesel oil having a boiling range from 140 to 170° C. (hydrogenated petroleum fraction) have been treated in a high speed disperser (Krupp Supraton™ type S200) at 60° C. for a period of 16 hours thus forming a gel-like dispersion. This Mg(OC$_2$H$_5$)$_2$-dispersion was transferred to a 130 dm$^3$ reactor equipped with an impeller stirrer and baffles and which already contained 19 dm$^3$ of diesel oil. After rinsing with 5 dm$^3$ of diesel oil 1.15 dm$^3$ (=10.5 mol) of TiCl$_4$, diluted to 4 dm$^3$ with diesel oil, were then added at 70° C. over a period of 4 hours at a stirring speed of 100 rpm. After a post-reaction time of 0.5 hour the suspension is cooled down to ambient temperature and the stirrer is switched offAfter the solid had settled, the supernatant liquid phase (mother liquor) was then decanted off to a residual volume of 50 dm$^3$. 70 dm$^3$ of fresh diesel oil (hydrogenated petroleum fraction having a boiling range from 140 to 170° C.) were subsequently introduced. After a stirring time of 20 minutes and a sedimentation period of ca. 90 minutes the supernatant liquid was again decanted off to a residual volume of 50 dm$^3$. This washing procedure was repeated until titanium concentration of the mother liquor was less than 10 mmol/dm$^3$. Afterwards the mixture was heated to 70° C. Subsequently 0.185 dm$^3$ (1.7 mol) of TiCl$_4$, diluted to 2 dm$^3$ with diesel oil was metered in over a period of 2 hours while stirring at a stirrer speed of 100 rpm. After a post-reaction time of 0.5 hour the suspension was heated to 110° C. and 49 dm$^3$ of a 15 wt-% solution of Al$_2$(C$_2$H$_5$)$_3$Cl$_3$ in diesel oil (hydrogenated petroleum fraction having a boiling range of 100-120° C.) were metered in over a period of 2 hours at a stirrer speed of 140 rpm. The temperature was subsequently maintained at 110° C. for a further 2 hours. Afterwards the suspension is cooled down to ambient temperature and the stirrer is switched off. After the solid had settled, the supernatant liquid phase (mother liquor) was then decanted off to a residual volume of 50 dm$^3$. Then, 70 dm$^3$ of fresh diesel oil (hydrogenated petroleum fraction having a boiling range from 140 to 170° C.) were introduced. After a stirring time of 20 minutes and a sedimentation period of ca. 90 minutes the supernatant liquid was again decanted off to a residual volume of 50 dm$^3$. This washing procedure was repeated until chlorine and titanium concentration of the mother liquor was less than 10 mmol/dm$^3$. The molar ratio of the solid (catalyst component A) was: Mg:Ti:Cl≈1:0.33:2.60. The titanium content of the solid catalyst component was 9.0 wt-% (0.53 kg catalyst per mol titanium). The polymerization was carried out as described in Example 1. The results of the polymerizations are listed in Table 1.

Example 7 a) Preparation of the Catalyst Component A:
A suspension of 4.0 kg (=35 mol) of commercial available Mg(OC$_2$H$_5$)$_2$ in 25 dm$^3$ of diesel oil having a boiling range from 140 to 170° C. (hydrogenated petroleum fraction) have been treated in a high speed disperser (Krupp Supraton™ type S200) at 60° C. for a period of 16 hours thus forming a gel-like dispersion. This Mg(OC$_2$H$_5$)$_2$-dispersion was transferred to a 130 dm$^3$ reactor equipped with an impeller stirrer and baffles and which already contained 19 dm$^3$ of diesel oil. After rinsing with 5 dm$^3$ of diesel oil 1.15 dm$^3$ (=10.5 mol) of TiCl$_4$, diluted to 4 dm$^3$ with diesel oil, were then added at 85° C. over a period of 4 hours at a stirring speed of 80 rpm. After a post-reaction time of 0.5 hour the suspension is cooled down to ambient temperature and the stirrer is switched off. After the solid had settled, the supernatant liquid phase (mother liquor) was then decanted off to a residual volume of 50 dm$^3$. 70 dm$^3$ of fresh diesel oil (hydrogenated petroleum fraction having a boiling range from 140 to 170° C.) were subsequently introduced. After a stirring time of 20 minutes and a sedimentation period of ca. 90 minutes the supernatant liquid was again decanted off to a residual volume of 50 dm$^3$. This washing procedure was repeated until titanium concentration of the mother liquor was less than 10 mmol/dm$^3$. Afterwards the mixture was heated to 85° C. Subsequently 0.185 dm$^3$ (1.7 mol) of TiCl$_4$, diluted to 2 dm$^3$ with diesel oil was metered in over a period of 2 hours while stirring at a stirrer speed of 80 rpm. After a post-reaction time of 0.5 hour the suspension was heated to 110° C. and 49 dm$^3$ of a 15 wt-% solution of Al$_2$(C$_2$H$_5$)$_3$Cl$_3$ in diesel oil (hydrogenated petroleum fraction having a boiling range of 100-120° C.) were metered in over a period of 2 hours at a stirrer speed of 80 rpm. The temperature was subsequently maintained at 110° C. for a further 2 hours. Afterwards the suspension is cooled down to ambient temperature and the stirrer is switched off. After the solid had settled, the supernatant liquid phase (mother liquor) was then decanted off to a residual volume of 50 dm$^3$. 70 dm$^3$ of fresh diesel oil (hydrogenated petroleum fraction having a boiling range from 140 to 170° C.) were subsequently introduced. After a stirring time of 20 minutes and a sedimentation period of ca. 90 minutes the supernatant liquid was again decanted off to a residual volume of 50 dm$^3$. This washing procedure was repeated until chlorine and titanium concentration of the mother liquor was less than 10 mmol/dm$^3$. The molar ratio of the solid (catalyst component A) was: Mg:Ti:Cl≈1:0.36:2.61. The titanium content of the solid catalyst component was 9.6 wt-% (=0.50 kg catalyst per mol titanium). The polymerization was carried out as described in Example 1. The results of the polymerizations are listed in Table 1.

Comparative Example 2

Preparation of the Catalyst Component A
A suspension of 4.0 kg (=35 mol) of commercial available Mg(OC$_2$H$_5$)$_2$ in 25 dm$^3$ of diesel oil having a boiling range from 140 to 170° C. (hydrogenated petroleum fraction) have been treated in a high speed disperser (Krupp Supraton ™ type S200) at 60° C. for a period of 16 hours thus forming a gel-like dispersion. This Mg(OC$_2$H$_5$)$_2$-dispersion was transferred to a 130 dm$^3$ reactor equipped with an impeller stirrer and baffles and which already contained 19 dm$^3$ of diesel oil. After rinsing with 5 dm$^3$ of diesel oil 1.15 dm$^3$ (10.5 mol) of TiCl$_4$, diluted to 4 dm$^3$ with diesel oil, were then added at 70° C. over a period of 4 hours at a stirring speed of 100 rpm. After a post-reaction time of 0.5 hour the suspension was heated to 110° C. and 49 dm$^3$ of a 15 wt-% solution of Al$_2$(C$_2$H$_5$)$_3$Cl$_3$ in diesel oil (hydrogenated petroleum fraction having a boiling range of 100-120° C.) were metered in over a period of 2 hours at a stirrer speed of 140 rpm. The temperature was subsequently maintained at 110° C. for a further 2 hours. Afterwards the suspension is cooled down to ambient temperature and the stirrer is switched off. After the solid had settled, the supernatant liquid phase (mother liquor) was then decanted off to a residual volume of 50 dm$^3$. 70 dm$^3$ of fresh diesel oil (hydrogenated petroleum fraction having a boiling range from 140 to 170° C.) were subsequently introduced. After a stirring time of 20 minutes and a sedimentation period of ca. 90 minutes the supernatant liquid was again decanted off to a residual volume of 50 dm$^3$. This washing procedure was repeated until chlorine and titanium concentration of the mother liquor was less than 10 mmol/dm$^3$. The molar ratio of the solid (catalyst component A) was: Mg:Ti:Cl≈1:0.30:2.30. The titanium content of the solid catalyst component was 8.1 wt-% (=0.59 kg catalyst per mol titanium). The polymerization was carried out as described in Example 1. The results of the polymerizations are listed in Table 1.

Example 8

Washed catalyst suspension of example 6 was heated up again under stirring at 100 rpm to a temperature of 85° C. Then cyclohexylmethyldimethoxymethylsilane in an amount corresponding to a molar ratio of 0.5:1 with respect to titanium was metered in over a period of 1 hour. After a post-reaction of 0.5 hours the suspension was cooled down to ambient temperature and the stirrer was switched off. After the solid had settled, the supernatant liquid phase (mother liquor) was then decanted off to a residual volume of 50 dm$^3$. 70 dm$^3$ of fresh diesel oil (hydrogenated petroleum fraction having a boiling range from 140 to 170° C.) were subsequently introduced. After a stirring time of 20 minutes and a sedimentation period of ca. 90 minutes the supernatant liquid was again decanted off to a residual volume of 50 dm³. This washing procedure was repeated four times. The molar ratio of the solid (=catalyst component A) was: Mg:Ti:Cl≈1:0.31:2.50. The titanium content of the solid catalyst component was 9.0 wt-% (=0.53 kg catalyst per mol titanium). The polymerization was carried out as described in Example 1. The results of the polymerizations are listed in Table 1.

Example 9

Example 9 was performed in the same way as described in example 8 with the exception that isobutyltriethoxysilane was used instead of cyclohexylmethyldimethoxymethylsilane.

The molar ratio of the solid (catalyst component A) was: Mg:Ti:Cl≈1:0.32:2.57. The titanium content of the solid catalyst component was 9.0 wt-% (=0.53 kg catalyst per mol titanium). The polymerization was carried out as described in Example 1. The results of the polymerizations are listed in Table 1.

TABLE 1

| Example | specific mileage kgPE/ (gcatalyst * $P_{C2}$ * h) | $MFR_{5/190}$ g/10 min | $FRR_{21.6/5}$ | $FRR_{21.6/2.16}$ | Bulk density g/dm³ | $d_{50}$ μm |
|---|---|---|---|---|---|---|
| 1 | 3.73 | 5.1 | 10.1 | 32.8 | 375 | 238 |
| 2 | 3.85 | 5.2 | 10.8 | 31.5 | 364 | 240 |
| 3 | 3.21 | 5.4 | 10.4 | 29.4 | 360 | 309 |
| 4 | 4.00 | 5.1 | 10.7 | 31.3 | 404 | 210 |
| 5 | 3.23 | 3.4 | 10.8 | 35.3 | 331 | 308 |
| 6 | 4.26 | 4.8 | 10.2 | 29.7 | 346 | 166 |
| 7 | 4.28 | 6.8 | 10.6 | 32.5 | 379 | 227 |
| 8 | 2.61 | 2.2 | 9.3 | 25.6 | 314 | 160 |
| 9 | 2.52 | 2.3 | 9.1 | 26.7 | 290 | 181 |
| C1 | 2.41 | 3.1 | 11.6 | 34.8 | 368 | 238 |
| C2 | 1.85 | 1.6 | 10.3 | 29.5 | 310 | 191 |

The invention claimed is:

1. A process for producing a solid catalyst component for the polymerization of olefins obtained by a process comprising the steps:
    (a) reacting in an inert hydrocarbon suspension medium a $Mg(OR_1)(OR_2)$ compound, in which $R_1$ and $R_2$ are identical or different and are each an alkyl radical having 1 to 10 carbon atoms, with a tetravalent transition metal compound having at least a metal-halogen bond, used in amounts such that the molar ratio of metal/Mg is from 0.05 to 5, thereby obtaining a solid reaction product dispersed in a hydrocarbon slurry,
    (b) washing the solid reaction product dispersed in a hydrocarbon slurry with a liquid hydrocarbon,
    (c) contacting the washed solid reaction product obtained in (b) with a tetravalent titanium compound, wherein the product of step (b) and the tetravalent titanium compound are contacted in a molar ratio of Ti/Mg ranging from 0.001 to less than 0.1, and
    (d) contacting the product obtained in (c) with an organometallic compound of a metal of group 1, 2 or 13 of the Periodic Table to produce the solid catalyst component, wherein the organometallic compound is contacted with the product of step (c) in a molar ratio of organometallic compound to magnesium ranging from 0.1 to 1.

2. The process of claim 1, wherein the $Mg(OR_1)(OR_2)$ compound is magnesium ethylate.

3. The process of claim 1, wherein the tetravalent transition metal compound used in step (a) and (c) is $TiCl_4$.

4. The process of claim 1, wherein the solid reaction product of step (c) is contacted with an organometallic compound chosen among organoaluminum compounds.

5. The process of claim 4, wherein the organoaluminum compounds are chlorine-containing organoaluminum compounds.

6. The process of claim 1, wherein after completion of step (d) the solid catalyst component is contacted with a silicon compound having the formula:

wherein
$R^I$-$R^{III}$ are linear, branched, cyclic or aromatic $C_1$-$C_{20}$ hydrocarbon groups,
a is an integer of from 0 to 2, and
b is an integer of from 0 to 2 with the proviso that (a+b) ranges from 1 to 3.

7. A catalyst system for the polymerization of olefins obtained by reacting the solid catalyst component according to claim 1 with a trialkylaluminum.

8. A process for the polymerization of olefins carried out in the presence of the catalyst system of claim 7.

9. The process of claim 6, wherein the transition metal compound of step (a) is of the formula (II): $MX_x(OR_4)_{4-m}$, wherein
M is titanium,
$R_4$ is an alkyl radical having from 1 to 9 carbon atoms,
X is a halogen atom, and
m is from 1 to 4,
with the proviso that when b of the silicon compound is 0, $R^I$ is a linear, branched, or cyclic alkyl radical or an aryl radical having from 3 to 10 carbon atoms and a is 1.

10. The process of claim 9, wherein the reaction of the magnesium alkoxide with the tetravalent transition metal compound is carried out at a temperature of from 50 to 140° C.

11. The process of claim 9, wherein $R_4$ is an alkyl radical having from 1 to 4 carbon atoms.

12. The process of claim 11, wherein X is chlorine.

13. The process of claim 9, wherein m is 2 to 4.

* * * * *